(12) United States Patent  
Channagiri et al.

(10) Patent No.: US 9,354,964 B2
(45) Date of Patent: May 31, 2016

(54) TAG BASED SELECTION OF TEST SCRIPTS FOR FAILURE ANALYSIS

(71) Applicant: NetApp, Inc., Sunnyvale, CA (US)

(72) Inventors: Anoop V. Channagiri, Bangalore (IN); Ankush H. Prasad, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 115 days.

(21) Appl. No.: 14/276,485

(22) Filed: May 13, 2014

(65) Prior Publication Data

US 2015/0331733 A1 Nov. 19, 2015

(51) Int. Cl.
*G06F 11/00* (2006.01)
*G06F 11/07* (2006.01)

(52) U.S. Cl.
CPC ................. *G06F 11/079* (2013.01)

(58) Field of Classification Search
CPC ............ G06F 11/0727; G06F 11/0766; G06F 11/0775; G06F 11/0778; G06F 11/0787; G06F 11/079; G06F 11/0793
See application file for complete search history.

(56) References Cited

U.S. PATENT DOCUMENTS

| | | | | |
|---|---|---|---|---|
| 7,136,768 B1* | 11/2006 | Shah | ................. | G06F 11/008 702/115 |
| 7,788,537 B1* | 8/2010 | Yellen | ................. | G06F 11/0727 714/38.11 |
| 7,895,470 B2* | 2/2011 | Nastacio | ............. | G06F 11/0709 714/25 |
| 8,060,782 B2* | 11/2011 | Caspi | ................. | G06F 11/0709 714/26 |
| 8,271,417 B2* | 9/2012 | Kuchibhotla | ....... | G06F 11/0748 706/47 |
| 8,296,104 B2* | 10/2012 | Ramacher | ........... | G06F 11/0748 700/206 |
| 9,170,868 B2* | 10/2015 | Dhuse | ................. | G06F 11/0727 |
| 2006/0112061 A1* | 5/2006 | Masurkar | ............ | G06F 11/0709 706/47 |
| 2013/0132657 A1* | 5/2013 | Kozlovsky | .......... | G06F 12/0246 711/103 |

* cited by examiner

*Primary Examiner* — Michael Maskulinski
(74) *Attorney, Agent, or Firm* — Mahamedi Pardice LLP

(57) ABSTRACT

A service system can include numerous test scripts that are candidates for execution against a failure message to determine a solution for a failure in a distributed storage system. To efficiently ascertain a solution for a failure with the test scripts, a service system can analyze the failure message to determine tags and use the tags to guide selection of test scripts. The selected test scripts are then executed to analyze the failure message, and to generate, based on the analysis, a solution corresponding to the failure. Instead of executing the numerous test scripts against the failure message, only selected test scripts are executed against the failure message to generate a solution. The solution is then communicated to the distributed storage system.

20 Claims, 6 Drawing Sheets

TAG BASED SELECTION OF TEST SCRIPTS FOR FAILURE ANALYSIS

BACKGROUND

The subject matter described herein generally relates to the field of distributed data storage, and, more particularly, to a tag-based approach for selection of test scripts for use in a distributed data storage environment.

Distributed storage systems allow users to reliably store and access large amounts of data. Storage devices (e.g., hard disk arrays, tape drives, NetApp® v-series open storage controllers, Fiber Channel switches, etc.) can be grouped together to provide gains in reliability, performance, and availability of distributed data storage solutions. Distributed storage systems also provide various additional functionality to the users such as backup, high-availability (HA), and redundancy, among others. However, with this additional functionality being provided to the users, there is also an increasing cost of maintaining the reliability of such distributed storage systems.

BRIEF DESCRIPTION OF THE DRAWINGS

The aspects of the disclosure described herein may be better understood, and numerous objects, features, and advantages made apparent to those skilled in the art by referencing the accompanying drawings.

DESCRIPTION OF EXAMPLE ILLUSTRATIONS(S)

The description that follows includes exemplary systems, methods, techniques, instruction sequences and computer program products that embody techniques of the subject matter described herein. However, it is understood that the described aspects of the disclosure may be practiced without these specific details. For instance, although some examples refer to storage controllers, aspects of the disclosure are not limited to interacting with storage controllers. References to storage controllers within these described examples could be replaced with references to file servers, servers, tape drive controllers, or any other of the various types of storage equipment used in storage virtualization and/or network based storage. In other instances, well-known instruction instances, protocols, structures and techniques have not been shown in detail in order not to obfuscate the description.

During operation of a distributed storage system, issues may arise, which can lead to a failure of operation of the distributed storage system. When such a failure occurs, a storage controller managing this distributed storage system can generate a failure message that contains information related to this failure. The failure message can include multiple portions, such as a summary portion, a memory content portion, and/or a log portion. The summary portion can indicate recent history of distributed storage operations executed by the storage controller. The memory content portion can include a snapshot of a local memory of the storage controller at the time the failure occurred. The log portion can include a log of the recent distributed storage operations performed by the storage controller. A service system processes this failure message.

A service system can include numerous test scripts (e.g., thousands) that can be executed against the failure message. To efficiently ascertain a solution for a failure with the test scripts, a service system can analyze one or more portions of the failure message to determine tags, and use the tags to guide selection of test scripts. The selected test scripts are then executed to analyze the failure message, and to generate, based on the analysis, a solution corresponding to the failure. Therefore, instead of executing the numerous test scripts against the failure message, only particular, selected test scripts are executed against the failure message to generate a solution. The solution is then communicated to the distributed storage system.

Figure 1:
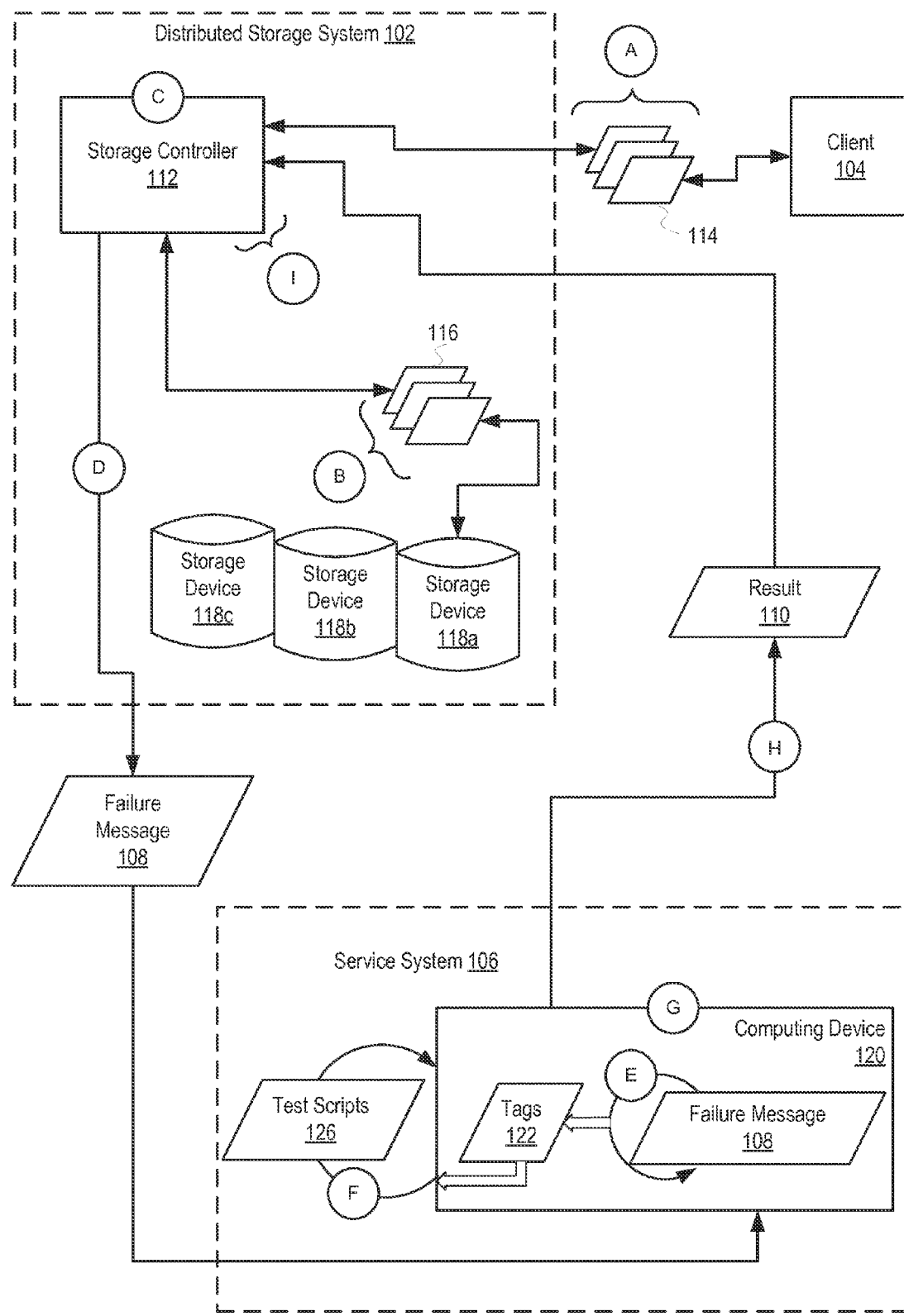
FIG. 1 depicts a diagram of an example tag influenced selection of test scripts related to a failure in operation of a distributed storage system, according to some aspects of the disclosure.

FIG. 1 depicts an example tag influenced selection of test scripts related to a failure in operation of a distributed storage system. FIG. 1 depicts a distributed storage system 102 that includes a storage controller 112 and storage devices 118a-118c. The distributed storage system 102 is configured to store data (such as data 114) received from clients, as well as provide stored data to the clients. Besides providing access to the storage devices 118a-118c, storage controller 112 can also provide various distributed storage operations, such as maintenance, redundancy, back-up, high-availability (HA), and/or other operations on the stored data.

The storage devices 118a-118c can be implemented using any number of storage devices (e.g., tape drives, disk drives, etc.). The storage controller 112 can be implemented using storage controllers described below with reference to FIG. 2. The distributed storage system 102 can implement block based storage (e.g., a storage area network (SAN)), file based storage (e.g., network attached storage (NAS)), a combination of SAN and NAS, etc. The distributed storage system 102 can provide a virtualized, clustered storage solution to a client 104.

FIG. 1 also depicts a service system 106 that includes a computing device 120. The service system 106 is configured to receive failure messages from the distributed storage system 102, which are generated upon failure in operation of the distributed storage system 102. The computing device 120 can select and execute one or more test scripts, as described below.

Stages performed by the systems in FIG. 1 are depicted with labels A to I. These labels are presented to aid in understanding this particular illustration, and are not to be used to limit the scope of the claims. Despite the sequence of letters used for these labels, the corresponding stages may overlap. Furthermore, some stages may be combined, or not used at all, depending on the implementation. Still further, some stages can be performed more than once.

At stage A, the client 104 sends data 114 for storage to the distributed computing system 102. Stage A can also include the client 104 requesting the data to be read from the distributed computing system 102.

At stage B, the storage controller 112 receives the data 114 and accesses the storage devices 118a-118c to store data 116. Similarly, the storage controller 112 can access the storage devices 118a-118c to retrieve the stored data, such as in response to a client request, or when performing another distributed storage operation.

At stage C, the storage controller 112 detects a failure in one of the distributed storage operations. Upon detection of a failure in operation of the distributed storage system 102, at stage C, the storage controller 112 generates a failure message 108 that includes information related to the failure. The storage controller 112 can detect a failure of a variety of distributed storage operations, such as during an attempt to write data to the storage devices 118a-118c. The storage controller 112 can detect various other failures, such as memory leaks and/or buffer overruns, among others.

At stage D, the storage controller 112 communicates the failure message 108 to the service system 106. The failure message 108 may be sent using a network or a bus (not depicted) that communicatively couples the distributed storage system 102 and the service system 106.

At stage E, a computing device 120 of the service system 106 performs a preliminary analysis on the received failure message 108. Based on the preliminary analysis, the computing device 120 determines tags 122 associated with the failure. The tags 122 are used to narrow down a number of test scripts that are selected for execution against the failure message 108.

During the preliminary analysis, the computing device 120 can determine the tags 122 based on the hardware and/or software characteristics of the distributed storage system as indicated by the failure message 108. The hardware characteristics can include configurations of the distributed storage system 102, or a number and/or type of storage devices 118a-118c. The software characteristics can include a type and version of an operating system running on the storage controller, or parameters of a distributed storage operation that was being performed by the storage controller 112 at the time of the failure.

The computing device 120 determines the tags 122 that correspond to the above determined characteristics of the storage controller and the distributed storage operation. For example, the computing device 120 can determine tags that correspond to a failure that was caused during a specific sub process of a certain distributed storage operation by an X series storage controller accessing type Y storage devices over a SAN network. These determined tags are then used for selecting test scripts.

At stage F, the computing device 120 selects one or more test scripts 126 that are associated with the determined tags 122, which were determined at stage E. The test scripts 126 are selected from stored test scripts based on the determined tags 122. For example, if the stored test scripts are stored using a database, then managing software for this database could search the database using the determined tags 122 to find test scripts with indexes or associated metadata that correspond to the determined tags 122. Some aspects of the disclosure of the selection of the test scripts 126 are described below with reference to FIG. 3.

At stage G, the computing device 120 executes the selected test scripts 126 on the failure message 108. For example, execution of a test script may trigger analysis of the memory content portion of the failure message 108. Typically, only one of the test scripts 126 includes tests that are capable of finding the failure in the failure message 108, and thus are able to generate a solution to the failure.

The solution yielded from executing the test script(s) can take various forms. The solution to the failure can be an executable file to be executed by the storage controller 112 of the distributed storage system 102. The solution to the failure can be a configuration file to be used by the storage controller 112 and/or by the storage devices 118a-118c. The solution to the failure can also be a new version of an operating system used by the storage controller 112, or an update to software and/or firmware of the storage controller 112. Once implemented by the storage controller 112, the solution typically fixes the failure.

The execution of the test script that generates the solution can also generate an analysis report for the failure. The analysis report can include a failure identification of the failure, a recommended solution, and/or a workaround. The failure identification can include a problem category, a unique identifier for the failure, and/or a description of the failure, including a description of the issues that led to the failure. A recommended solution can inform an administrator of the distributed storage system 102 of how the solution fixes the failure. A workaround can inform a user and/or administrator of a workaround to prevent the failure. For example, whereas the solution is typically implemented to prevent a future failure due to the same issues, a workaround can suggest use of an alternative process and/or sequence of steps that would avoid the issues that led to the failure.

At stage H, a result 110 with the solution is communicated to the storage controller 112. The result 110 can be implemented as a file or a message that can be transmitted over a network or a bus (not depicted). The result 110 can also include the analysis report.

At stage I, the storage controller 112 receives and implements the solution communicated with the result 110. Depending on the solution, the storage controller 112 can automatically execute an executable file, install software updates, and/or update its configuration. If the storage controller 112 also receives an analysis report, the storage controller 112 can present the analysis report to an administrator of the distributed storage system 102.

Figure 2:
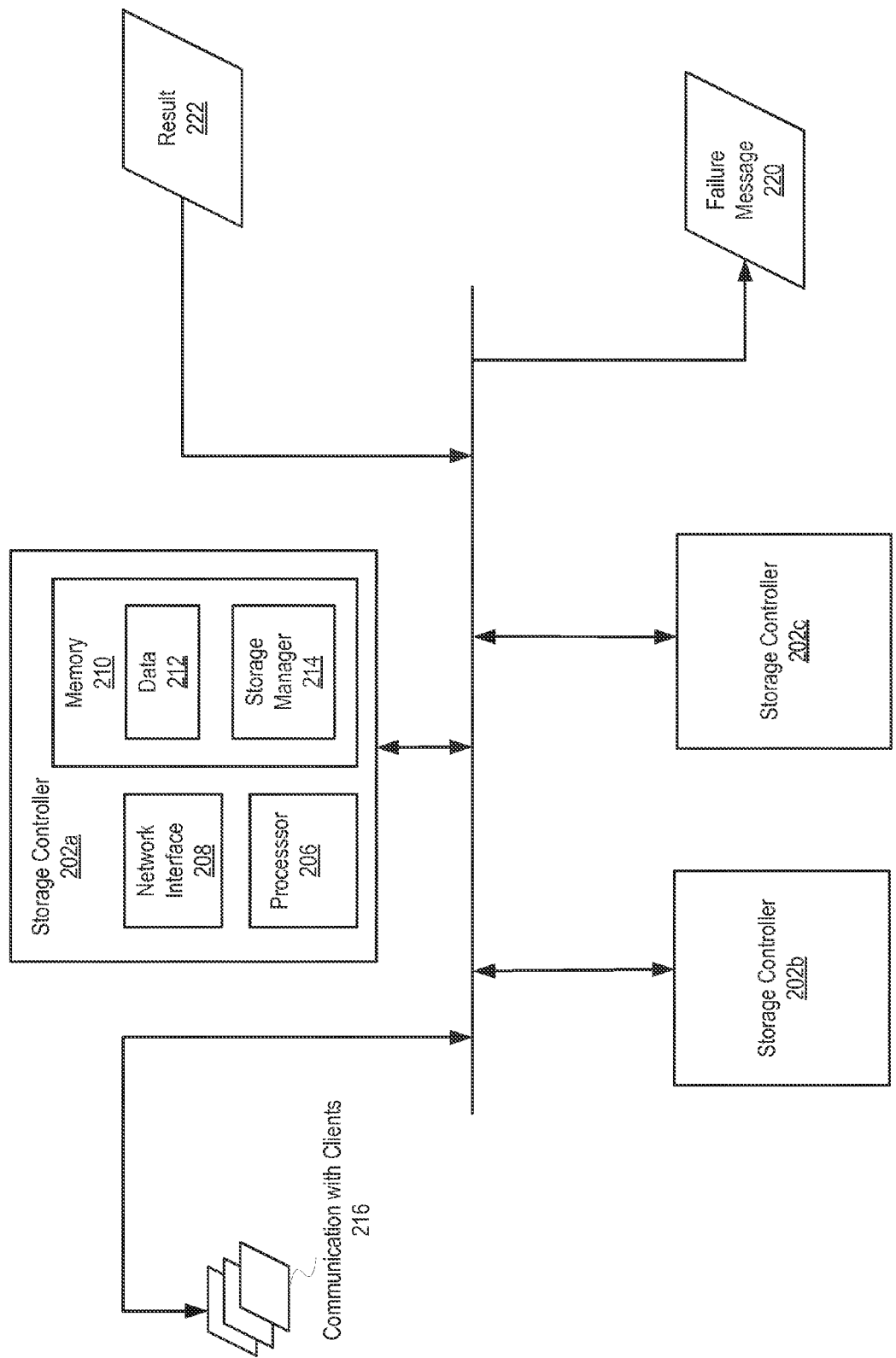
FIG. 2 depicts a diagram of an example portion of a distributed storage system, according to some aspects of the disclosure.

FIG. 2 depicts an example portion of a distributed storage system. The distributed storage system of FIG. 1 can be implemented similarly. FIG. 2 depicts an example distributed storage system that uses three storage controllers 202a-202c. A storage controller 202a includes a processor 206, a network interface 208, and a memory 210. The memory 210 includes data 212 and a storage manager 214. The processor 206 is configured to execute the storage manager 214. The network interface 208 is configured to communicate with the storage controllers 202b and 202c, as well as with a service system and clients. The data 212 includes various data structures used by the storage manager 214. The storage manager 214 performs various distributed storage operations, including performing communication with clients (such as receiving distributed storage operation requests from clients to store or access data). Upon a failure in operation of one of the storage controllers 202a-202c, the storage manager 214 generates a failure message 220.

In some aspects of the disclosure, the functionality of the storage manager 214 can be distributed across multiple storage controllers, including storage controllers 202b and 202c. If one of the instances of the storage manager fails, such as due to a software and/or a hardware failure, another storage controller can take over the functionality previously provided by the failed storage controller. Furthermore, one of the operational storage controllers 202a-202c can provide a failure message to the service system indicating the failure. The storage manager 214 receives a result 222 from the service system (not depicted). The result 222 includes a solution for implementation by the storage manager 214.

One of the distributed storage operations includes a consistency point write, where every X minutes the storage manager 214 flushes some portions of locally stored data 212 to the storage devices. In one example, this failure during the consistency point write can be referred to as a "Write Anywhere File Layout (WAFL®) hung", indicating that one of the WAFL operations failed to properly execute. In another example, the storage manager 214 can detect a failure during an access of data 212. The failure can occur as a page fault or as a data corruption failure, such as where two separate processes write data to the same memory area. In another example, the storage manager 214 can detect a failure during process switching of one of the processes running on the storage controller 202a. The storage manager 214 can also monitor communication from the storage controllers 202b or 202c to detect a failure of a distributed storage operation that is performed by the storage controllers 202b or 202c.

Figure 3:
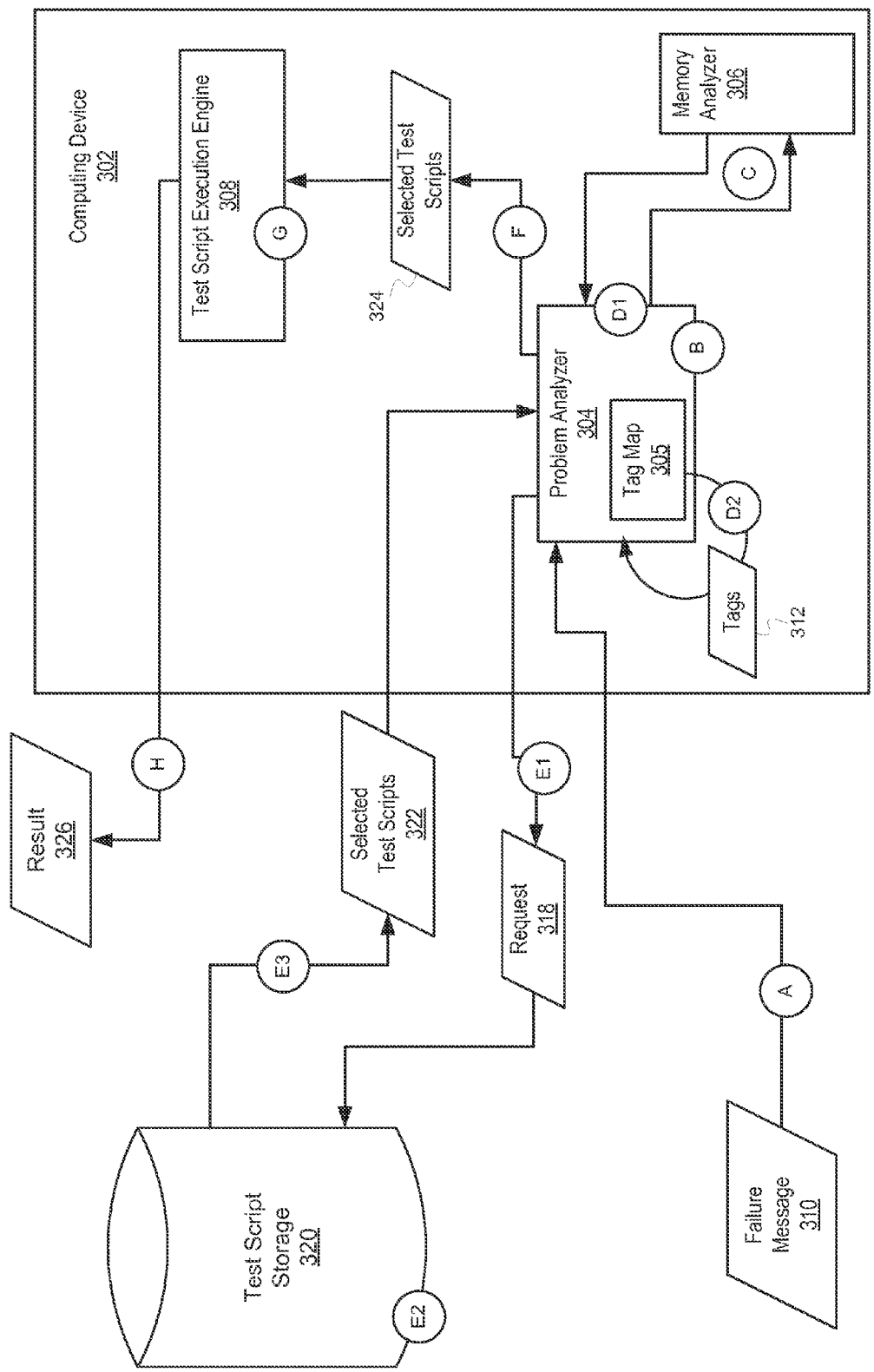
FIG. 3 depicts a diagram of a service system that determines tags for test script selection based on mappings between tags and values of characteristics, according to some aspects of the disclosure.

FIG. 3 depicts a service system that includes a computing device 302 that determines tags for test script selection based on mappings between tags and values of characteristics. The service system of FIG. 1 can be implemented similarly. The computing device 302 includes a problem analyzer 304, a memory analyzer 306, and a test script execution engine 308.

Stages performed by the systems of FIG. 3 are depicted with labels A to H. These labels are presented to aid in understanding this particular illustration, and are not to be used to limit the scope of the claims. Despite the sequence of letters used for these labels, the corresponding stages may overlap. For example, stage B can be performed during the performance of stages C and/or D. Furthermore, some stages may be combined, or not used at all, depending on the implementation. Still further, some stages can be performed more than once. For example, stages B-D can be performed multiple times.

At stage A, the problem analyzer 304 receives a failure message 310 from a distributed storage system. The failure message 310 indicates a failure in operation of the distributed storage system. The failure message 310 includes multiple portions, such as a summary portion, a memory content portion, and/or a log portion. The summary portion can indicate a recent history of distributed storage operations executed by the storage controller, a memory location of the storage controller where the failure occurred, and/or a software module and/or line of code related to this failure.

The memory content portion can include a snapshot of the local memory of the storage controller at the time the failure occurred. In some aspects of the disclosure, the memory content portion can be implemented as a "core-file" portion. The core-file portion can include a dump-core sub-portion and a save-core sub-portion. The core-file portion can preserve contents of memory of the storage controller at time of the failure. The save-core portion can store data used for a subsequent reboot or a failover. The log portion can include a log of the recent distributed storage operations performed by the storage controller, such as data access operations requested by the client, or maintenance operations performed by the storage controller. The log portion can also indicate various commands performed by multiple storage controllers for distributed storage operations performed across multiple storage controllers.

At stage B, the failure message 310 is accessed by the problem analyzer 304. The problem analyzer 304 starts a preliminary analysis of the failure message 310 to determine a solution to the failure by analyzing the memory content portion of the failure message 310. The problem analyzer 304 completes the preliminary analysis of the failure message 310 in stages C and D.

At stage C, the problem analyzer 304 communicates with the memory analyzer 306 to analyze the memory portion of the failure message 310. The memory analyzer 306 can be implemented as a memory analyzer and/or a software trace analyzer. The problem analyzer 304 can send instructions to the memory analyzer 306, where the instructions specify to access the memory content portion of the failure message 310. The instructions can instruct the memory analyzer 306 to access certain data of the memory content portion of the failure message 310. The memory portion of the failure message 310 can store data related to a first set of characteristics. For example, the first set of characteristics can indicate a hardware configuration of the distributed storage system, such as a characteristic indicating a type of the storage controller (e.g., "characteristic_controller_type"). The first set of characteristics can also indicate a type and version of the operating system executing on the storage controller (e.g., "characteristic_OS_Version"). The accessed data is then communicated by the memory analyzer 306 to the problem analyzer 304 for analysis.

At stage D, tags are determined by the problem analyzer 304 based on the accessed data. For ease of explanation, stage D is divided into stages D1 and D2. At stage D1, the problem analyzer 304 analyzes the data received from the memory analyzer 306 to determine values for a set of characteristics (such as for a first set of characteristics, also referred to as first characteristics). In one implementation, the problem analyzer 304 can access the received data at certain locations within the failure message (such as at predefined locations in accordance with a message specification) that contain values for these characteristics. In another implementation, the problem analyzer 304 uses signature analysis that compares the received data to signatures of known characteristics to determine values for these characteristics.

For the example given above, the problem analyzer 304 can analyze the accessed data for a value of the characteristic indicating a type of the storage controller (e.g., "characteristic_controller_type"), which can have a value of "Controller X." The problem analyzer 304 can also analyze the accessed data for a value of the characteristic indicating a type and version of the operating system executing on the storage controller (e.g., "characteristic_OS_Version"), which can have a value of "8.0."

At stage D2, the problem analyzer 304 determines tags 312 based on the values of the characteristics. Each tag can be implemented as a descriptor or metadata that is associated with one or more test scripts. The problem analyzer 304 accesses a tag map 305 to determine a tag that is associated with a characteristic and/or a value of the characteristic. Aspects of the disclosure are not limited to mapping a single tag to a single characteristic or to a single characteristic value, assuming a "single tag" is considered a single term or a single keyword. For instance, a set of tags "OS version validation" can be mapped to a characteristic "operating_system."

Furthermore, a mapping may be conditional. To illustrate, the problem analyzer 304 may determine whether the failure message 310 indicates a value for an operating system version characteristic that is less than 8.3. If so, then the tags "OS version validation" are used for script selection. Otherwise, the tags "OS version validation" are not used because the problem analyzer 304 has been configured to eliminate an OS version as a possible reason for the failure when the version is at least 8.3 (i.e., 8.3 has been configured as a threshold for an up to date OS version). Returning to the earlier example above with Controller X and 8.0, the problem analyzer 304 accesses the tag map 305 to find a mapping between the value of "Controller X" for the controller type characteristic and a corresponding tag. The problem analyzer 304 also accesses the tag map 305 to find another mapping between the value of "8.0" for the operating system version characteristic and another corresponding tag.

The problem analyzer 304 can continue to perform the preliminary analysis of additional data of the failure message 310 until a certain number of characteristics is processed. In some aspects of the disclosure, the problem analyzer 304 continues to perform the preliminary analysis until the problem analyzer 304 can determine at least a certain number of tags based on the known values of the characteristics.

The problem analyzer 304 can determine a second set of characteristics based on the values for the first set of characteristics. For example, if the values for the first set of characteristics indicate a version 8.0 of the operating system, then the problem analyzer 304 determines second characteristics that are pertinent to the 8.0 version of the operating system, which may be different (such as by the number, names, and/or types of variables used; a number and/or type of distributed storage operations being available; etc.) from characteristics pertinent to other versions of that operating system. For instance, the problem analyzer 304 may determine "operating system version" as tags based on the first characteristics. The problem analyzer 304 then determines a second tag(s) that maps to a value of a second characteristic (e.g., type of operation) depending upon the value 8.0 for the operating system version characteristic and/or the tags that mapped to the operating system version characteristic.

In another example, if the first characteristics indicate a distributed storage operation that was performed using multiple storage controllers, then the problem analyzer can access the log portion of the failure message to determine various commands that were executed by the multiple storage controllers at the time of the failure. In other words, first characteristics can guide the preliminary analysis (e.g., which part of the failure message to analyze) as well as guide tag mappings to subsequent characteristics values.

Continuing with the above example, based on the values of the first characteristics, the problem analyzer 304 determines certain second characteristics associated with distributed storage operations that are pertinent to the 8.0 version of the operating system. Once the second characteristics are determined, then the problem analyzer 304 determines the locations of the second characteristics in the memory portion of the failure message 310 based on the values of the first characteristics. The problem analyzer 304 then instructs the memory analyzer 306 to access the failure message 310 for data related to these second characteristics. The problem analyzer 304 then analyzes the received data for values for the second set of characteristics.

The problem analyzer 304 determines whether to process additional characteristics. A characteristic is processed when the problem analyzer 304 accesses the data from the failure message 310 to determine a value for that characteristic. The determination whether to process additional characteristics can be based on the number of characteristics already processed, such as whether the problem analyzer 304 has processed a predetermined number of characteristics, regardless of the values of characteristics in each set. For example, the problem analyzer 304 can process ten characteristics in accordance with configuration of the problem analyzer 304.

This determination can also be based on whether the problem analyzer 304 can select a certain number of test scripts using the determined tags. For example, if the number of test scripts that are selectable using the determined tags is greater than a test script threshold, the problem analyzer 304 can determine that additional characteristics should be processed to determine additional tags for further refinement of test script selection. If the problem analyzer 304 determines that the number of selected test scripts is to be refined, stages C and D are performed again.

At stage E, test scripts are selected based on the tags. For ease of explanation, stage E is divided into three stages, E1-E3. At stage E1, the problem analyzer 304 communicates a request 318 to the test script storage 320. The request 318 is based on the determined tags 312. At stage E2, the test scripts 322 are selected from the test script storage 320 based on the request 318. At stage E3, the selected scripts 322 are communicated to the problem analyzer 304.

The test script storage 320 stores numerous test scripts. Each of the test scripts stored by the test script storage 320 can be identified using one or more tags. At stage E1, the request 318 can include the determined tags, or otherwise indicate one or more test scripts to be selected from the test script storage 320. For example, the problem analyzer 304 can access a structure that indexes indications of the test scripts stored in the test script storage 320 by tags. The problem analyzer 304 indexes into this structure with a determined tag to determine an indication of a test script. The indication of the test script can be implemented with various techniques. For example, the indication can be the index used by the test script storage 320, an address of the test script in the test script storage 320, a name of the test script, etc. In addition, some aspects of the disclosure can combine tags when determining a test script associated with multiple tags (e.g., concatenate tags, hash the tags, etc.). Aspects of the disclosure can also implement a multi-dimensional indexing structure when multiple tags or indications of tags are used to select a test script.

At stage F, the problem analyzer 304 communicates the selected test scripts 324 to the test script execution engine 308.

At stage G, the test script execution engine 308 executes the selected test scripts 324 against the failure message 310. As an example, the test script execution engine 308 executes the selected test scripts 324 that are associated with a second portion of a consistency point write as indicated by the determined tags 312. The selected test scripts 324 can include a first test script and a second test script. The first test script, when executed, can analyze a first portion of the memory content portion of the failure message 310 for a failure associated with failure A. The second test script, when executed, can analyze a different portion of the memory content portion of the failure message 310 for a failure associated with failure B. It is noted that the number of selected test scripts varies, such as from a single test script for one failure, to fifty test scripts for another failure. Typically, execution of only one of the selected test scripts 324 determines a solution to the failure, such as a solution for failure B.

At stage H, the test script execution engine 308 then communicates a result 326 with the solution to the failure to the distributed storage system. For example, the test script execution engine 308 communicates the result 326 that includes the solution to failure B.

In FIG. 3, one or more of the units 302, 304, 308 can be implemented in software and or hardware. For example, the computing device 302 can be implemented using a computing device that includes a processing unit, a network interface, and a memory. The memory stores executable instructions (that are executable by the processor) for the problem analyzer 304, the memory analyzer 306, and/or the test script execution engine 308. The units 302, 304, 308 are shown as being separate for the ease of explanation only, and one or more of these units can be combined, or further separated, as desired. Furthermore, a test script storage 320 can be implemented using memory local to the computing device 302, although shown as being located outside the computing device 302.

Figure 4:
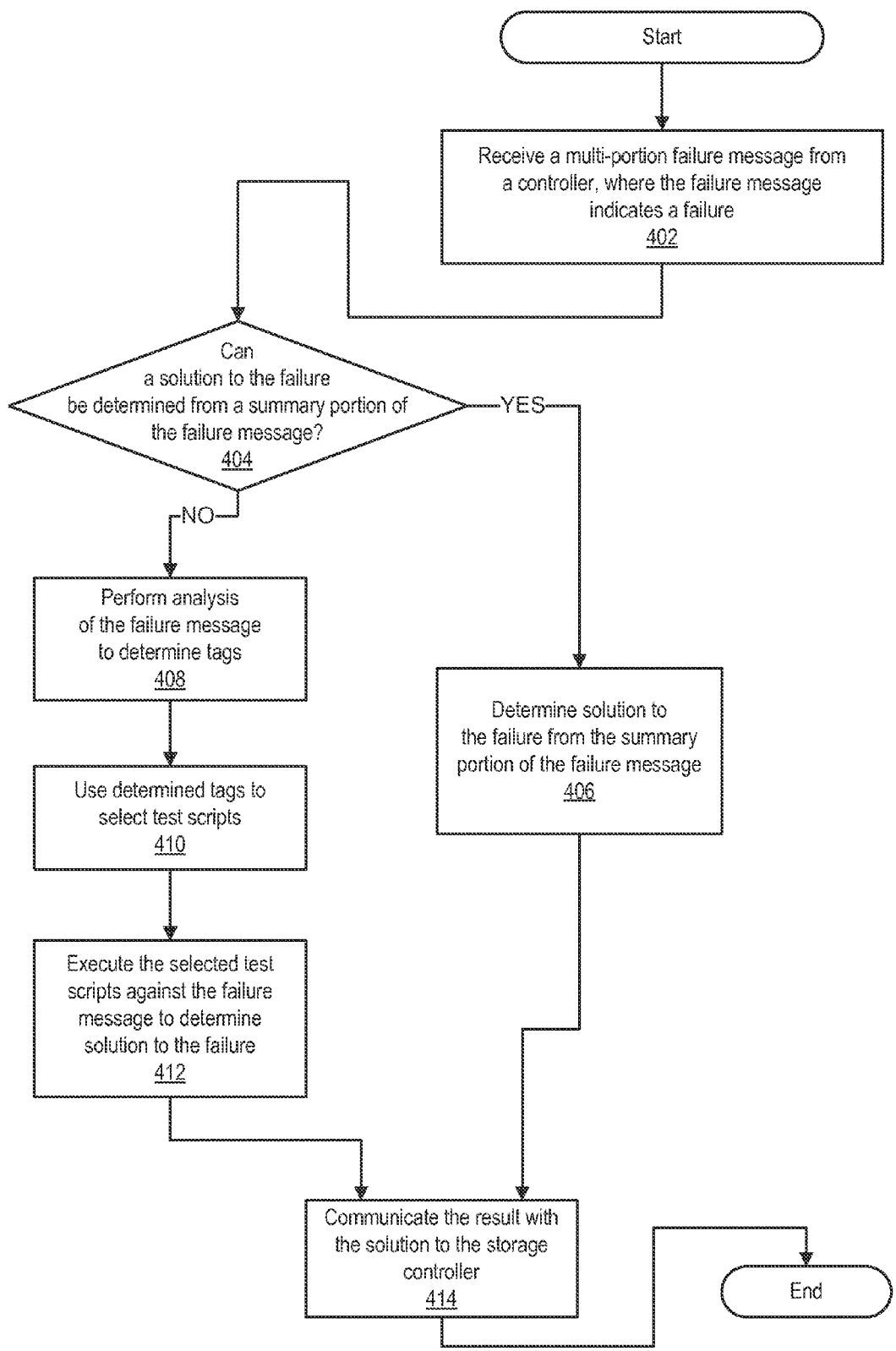
FIG. 4 depicts a flowchart of example operations for selection of test script(s) related to a failure in operation of a distributed storage system, according to some aspects of the disclosure.

FIG. 4 depicts a flowchart of example operations for selection of test script(s) related to a failure in operation of a distributed storage system.

At block 402, a failure message with multiple portions is received. The failure message indicates a failure of a distributed storage operation and/or of a storage controller. In these example operations, the failure message includes a summary portion, a memory content portion, and/or a log portion. Control then flows to block 404.

At block 404, it is determined whether a solution to the failure can be determined from the summary portion of the failure message. If the solution to the failure can be determined from the summary portion of the failure message, without analyzing the memory portion of the failure message, control flows to block 406. If the solution to the failure is not determined from the summary portion of the failure message, control flows to block 408.

At block 406, a solution to the failure is determined from the summary portion of the failure message. In one aspect of the disclosure, the solution can be determined by selecting, based on the summary portion, and then executing one or more test scripts. In this aspect of the disclosure, the test scripts are executed against the summary portion of the failure message to determine the solution. In other aspects of the disclosure, a solution can be determined directly from a summary portion of the failure message, i.e., without selecting or executing any test scripts. Control then flows to block 414.

If the solution could not be determined from the summary portion (block 404), then the failure message is analyzed to determine one or more tags at block 408. In this illustration, the memory content portion of the failure message is analyzed to determine the tags. In some aspects of the disclosure, other portions of the failure message can also be analyzed when making this tag determination, for example a header portion of the failure message. This failure message analysis for tag determination may involve a single pass or multiple passes over the failure message.

As an example of multiple-pass failure message analysis for tag determination, a process of a service system can be programmed to search a failure message for specified characteristics (e.g., an operating system version field and storage system type field). The process can be programmed to search the failure message in accordance with various techniques (e.g., search for field identifiers, jump to offsets in accordance with a failure message specification, etc.). After locating the specified fields, the process reads the values assigned to those specified fields (e.g., 8.3 and SAN). The process then accesses a structure that associates failure message information with tags (e.g., the tag map 305 of FIG. 3). The process uses the specified characteristic (e.g., an operating system version) and the corresponding value (e.g., 8.3) to determine a tag or tags. In some cases, a tag or tags are conditionally associated to a specified characteristic and corresponding value.

As mentioned earlier, a tag or tags may only be yielded for the operating system version characteristic if the corresponding value is below a value configured as a threshold for an operating system to be up to date. The process can analyze the failure message in a second pass during tag determination from the first pass, or after tag determination from the first pass. The process can be configured, for example, to make a second pass on the failure message if no tag is yielded from the first pass, or if a particular tag is determined. In some implementations, the failure message analysis for tag determination locates specified characteristics and extracts corresponding values from the failure message as the tags (i.e., copies the values or parts of the values as the tags). A process can also extract the indications of the specified characteristics as tags (e.g., use a portion of a field identifier as a tag) and/or determine a tag associated with the specified characteristic from data that associates characteristics with tags.

Tags can be associated with various data indicated by the failure message. Tags can be associated with characteristics of the storage controller hardware and software where the failure occurred. Examples of characteristics of the storage controller hardware and software include a type of SAN being used, a type and version of an operating system running on the storage controller, and the amount of local memory of the storage controller. Tags can be associated with a type of a distributed storage operation during which the failure occurred. Tags can be associated with a stage of the distributed storage operation being performed at the time of the failure. For example, tags A, B, and C that are associated with memory accesses can be determined at block 408. Control then flows to block 410.

At block 410, the determined tags are used to select one or more test scripts from a test script repository. The determined tags can be used to select test scripts from the test script repository. With reference to the example above, using the three tags A, B, and C, ten test scripts that are associated with memory access page faults can be selected from thousands of test scripts that are available in the test script repository. The ten selected test scripts can be selected based on each of these ten test scripts being associated with the three tags A, B, and C. Control then flows to block 412.

At block 412, the selected test scripts are executed against the failure message to determine a solution for the failure. For example, a selected test script executes against the failure message by performing an analysis of the memory portion of the failure message to test for an occurrence of a certain failure. With reference to the example above, the ten selected test scripts are executed against the failure message to test for different page fault failures. The ten selected test scripts can be executed in a certain order, such as based on a likelihood of each of the different page fault failures occurring, or based on a length of execution of each of the selected test scripts, and/or based on other criteria. If execution of one of the selected test scripts does not determine a solution to the failure, the next selected test script is executed. Once execution of one of the selected test scripts determines a solution to the failure, any remaining selected test scripts are not executed. If none of the selected test scripts determines a solution to the failure, an administrator of the service system can be notified, for example, to perform additional tests on the failure message. Control then flows to block 414.

Control flows to block 414 from block 406 or from block 412. At block 414, a result with the solution to the failure is communicated to the controller of the distributed storage system. The solution can include an executable file, a software update, and/or a configuration update. The result can further include an analysis report. After block 414, the process described by FIG. 4 ends.

Figure 5:
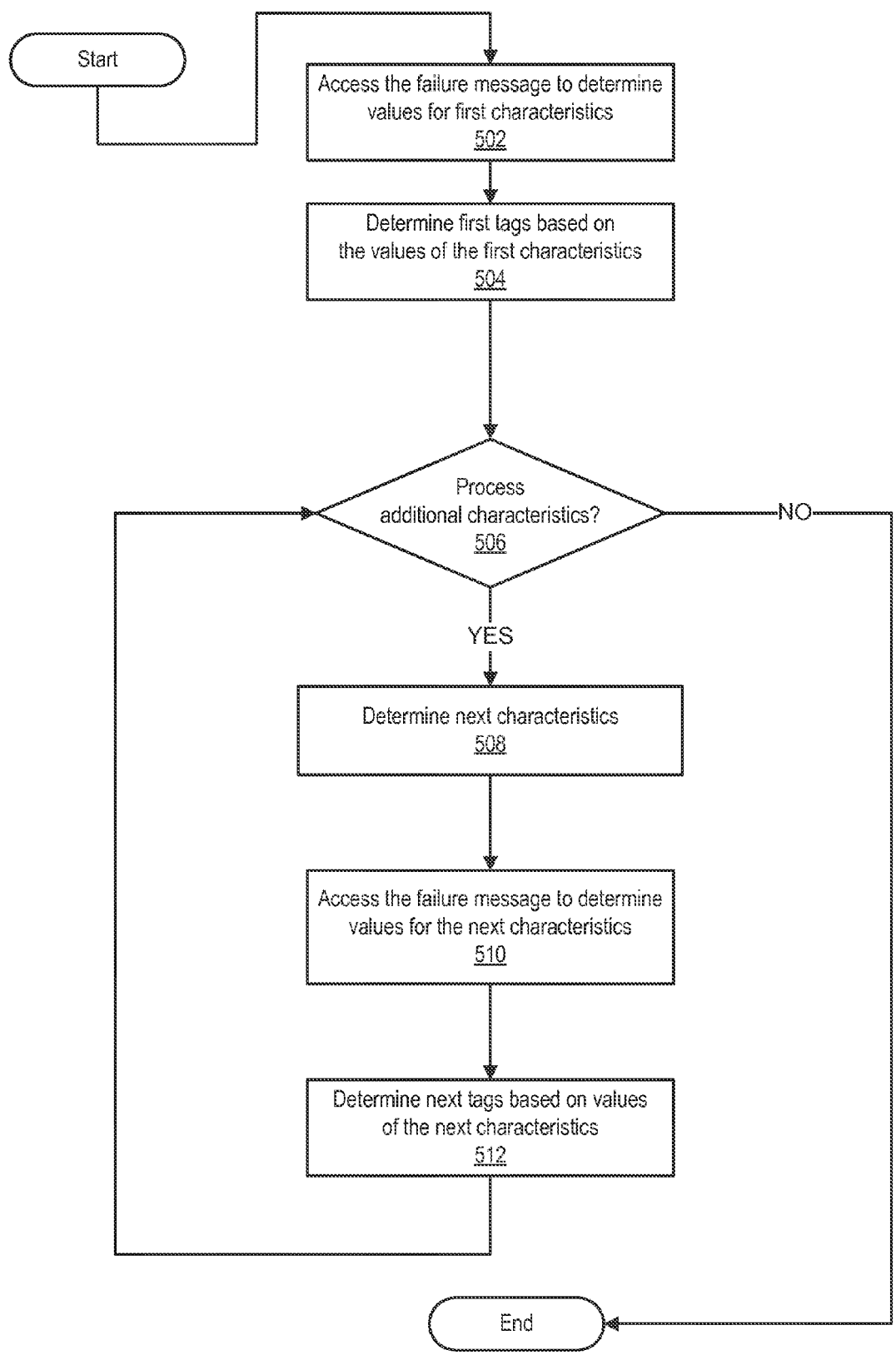
FIG. 5 depicts a flowchart of example operations of a preliminary analysis of a failure message, according to some aspects of the disclosure.

FIG. 5 depicts a flowchart of example operations of a preliminary analysis of a failure message. Block 408 of the flowchart of FIG. 4 can be implemented similarly.

At block 502, the failure message is accessed to determine values for first characteristics, a process referred to as a processing of the first characteristics. The first characteristics can specify the types, versions, and/or categories of the software and/or hardware of a distributed storage system. The failure message is thus analyzed to determine values for the types, versions, and/or categories of the software and/or hardware of the distributed storage system. However, in some aspects of the disclosure, the first characteristics can be associated with other attributes of the distributed storage system, such as a type of distributed operation performed at the time of the failure. Control then flows to block 504.

At block 504, one or more first tags are determined based on the values of the first characteristics. The tags can be determined by accessing a tag map that includes mappings between values of characteristics and tags. The first tags can correspond to the types, versions, and/or categories of the software and/or hardware of the distributed storage system. For example, the first tags can include a tag specifying a software type, another tag specifying a version of that software, and another tag specifying a hardware type. Control then flows to block 506.

At block 506, a determination is made whether additional characteristics are to be processed. A characteristic is processed when the failure message is accessed to determine a value for that characteristic. In some aspects of the disclosure, this determination is based on a total number of characteristics that were processed. The determination can include determining whether the number of characteristics already processed is greater than a characteristics threshold. For example, the determination can include determining whether tags have been determined for a characteristics threshold of ten characteristics.

In one aspect of the disclosure, the characteristics threshold (i.e., the overall number of characteristics for which tags are to be determined) can be dynamically modified as based on values of the previous characteristics. For example, it can be determined that tags for ten characteristics are to be determined for a certain combination of values of an operating system version, a hardware controller, and a distributed storage operation. But tags for only five characteristics are to be determined for a combination of different values of an operating system version, a hardware controller, and a distributed storage operation.

In some aspects of the disclosure, the determination of block 506 includes determining whether the number of test scripts selected using the currently determined tags can be reduced to be below a test script threshold. For example, if the overall number of available test scripts is 10,000, this determination at block 506 can be based on whether the determined tags can be used to refine selection of test scripts to be smaller than a test script threshold of 100 test scripts (or another test script threshold). If additional characteristics are not to be processed, the process described by FIG. 5 ends. If the additional characteristics are to be processed, control flows to block 508.

At block 508, the next characteristics to be processed are determined. For example, when block 508 is first performed, the next characteristics can relate to the distributed storage operation as performed by the controller at the time of the failure. On a next iteration of block 508, the next characteristics can relate to attributes associated with data transfer between the storage controller and the storage devices as performed by the storage controller at the time of the failure.

In some aspects of the disclosure, the next characteristics are determined based on the values for the previous characteristics (i.e., based on a value of the first characteristics for a first performance of block 508, based on a value of second characteristics for a second performance of block 508, etc.). For example, depending on a value for an OS version characteristic (one of the first characteristics), such as version 2.x or version 4.x, then the second characteristics are determined to include characteristics associated with operations that are supported by that particular OS version. Continuing with the example above, if block 508 is performed for the second time for a value of 4.x for the OS version characteristic of the first set of characteristics and a value of a consistency write of an operation characteristic, then the second characteristics can be determined to be particular characteristics related to the consistency write operation on a storage controller with OS version 4.x. Control then flows to block 510.

At block 510, the failure message is accessed to determine values for the next characteristics. Continuing with the example above, in a first performance of block 510, the failure message is accessed to determine values for the second characteristics of the consistency write operation for a storage controller running a certain OS version 4.x. Control then flows to block 512.

At block 512, one or more next tags are determined based on the values of the next characteristics. The tags can be determined by accessing a tag map that includes mappings between values of characteristics and tags. Continuing with the example above, in the second performance of block 512, the next tags are determined to indicate that a second step of the consistency write operation has failed. It is noted that upon completion of the flowchart of FIG. 5, all of the tags determined in each performance of block 512 can be used, such as to select test scripts. Control then flows to block 506.

The example operations depicted in FIG. 4 and FIG. 5 could be performed by a program that embodies various elements of the computing device 120 depicted in FIG. 1 and/or of the computing device 302 depicted in FIG. 3. Since a program code can be assigned any of a variety of names and be implemented with various languages and techniques, flowcharts are described without specifying a particular actor since the functionality is not dependent on any particular actor. As will be appreciated in light of the disclosure, this flowchart may be modified in order to derive alternative aspects of the disclosure. Also, some operations in this aspect of the disclosure are shown in sequential order. However, certain operations may occur in a different order than shown, certain operations may be performed concurrently, certain operations may be combined with other operations, and certain operations may be absent in another aspect of the disclosure. For instance, block 412 of FIG. 4 is described with an example of executing ten test scripts in order until a solution is found or all of the scripts are executed. This successive execution of the test scripts is not constrained to exclusive execution. Aspects of the disclosure can initiate execution of a first test script and then initiate execution of a next test script. Aspects of the disclosure can set a threshold for a number of test scripts for which execution can be initiated without waiting for completion of already executing test scripts. If a solution is yielded from a test script, then any other test scripts that are still executing can be canceled. In addition, a solution yielded from a later executed test script can be held until earlier executed test scripts complete, assuming an aspect of the disclosure that uses solution based on the order of the test scripts.

As will be appreciated by one skilled in the art, aspects of the subject matter described herein may be embodied as a system, method or computer program product. Accordingly, aspects of the subject matter described herein may take the form of an entirely hardware aspect of the disclosure, an entirely software aspect of the disclosure (including firmware, resident software, micro-code, etc.) or an aspect of the disclosure combining software and hardware aspects that may all generally be referred to herein as a "circuit," "module" or "system." Furthermore, aspects of the subject matter described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be communicated using any appropriate medium, including but not limited to wireless, wireline, optical fiber cable, RF, etc., or any suitable combination of the foregoing.

Computer program code for carrying out operations for aspects of the subject matter described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the subject matter described herein are described with reference to flowchart illustrations and/or block diagrams of methods, apparatus (systems) and computer program products according to aspects of the disclosure described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
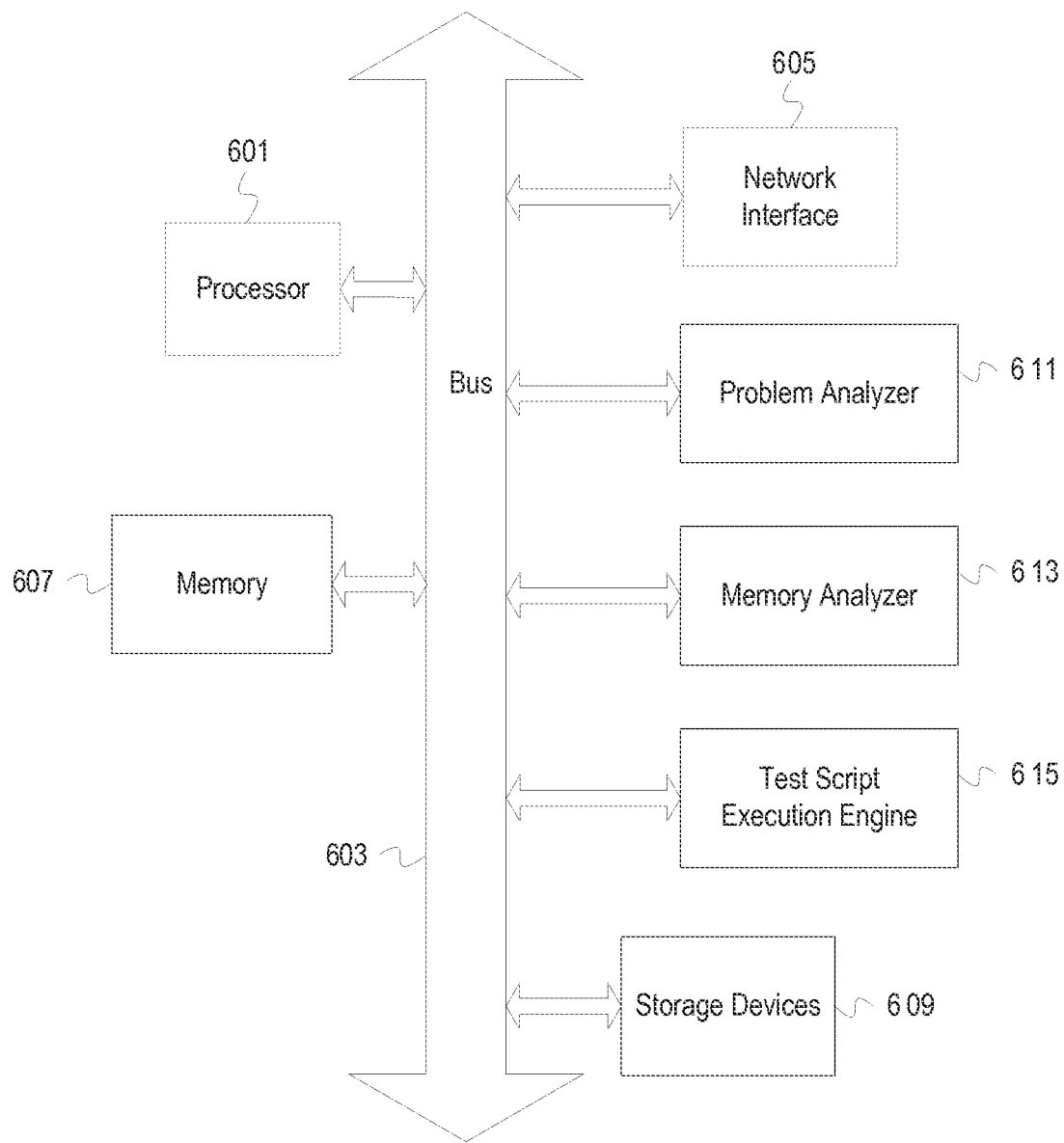
FIG. 6 depicts an example computer system including a problem analyzer, a memory analyzer, and a test script execution engine, according to some aspects of the disclosure.

FIG. 6 depicts an example computer system including a problem analyzer, a memory analyzer, and a test script execution engine. The example computer system includes a processor 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computer system also includes a bus 603 (e.g., PCI, ISA, PCI-Express, HyperTransport® bus, InfiniBand® bus, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The computer system also includes a problem analyzer 611, a memory analyzer 613, and a test script execution engine 615. The problem analyzer 611 performs a preliminary analysis of a failure message to determine one or more tags. The memory analyzer 613 accesses data of the failure message. The test script execution engine 615 executes selected test scripts that are selected using the determined tags.

The functionality of the problem analyzer 611, the memory analyzer, and/or the test script execution engine can be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601, the storage device(s) 609, and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects of the disclosure are illustrative and that the scope of the subject matter described herein is not limited to them. In general, techniques for selection and/or execution of test scripts related to a failure in operation of a distributed storage system, as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the subject matter described herein. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the subject matter described herein.

What is claimed is:

1. A method comprising:
   determining values of first characteristics indicated by a communication received from a storage controller, wherein the communication indicates a failure;
   determining first tags associated with the failure based, at least in part, on the values of the first characteristics;
   determining second characteristics from the communication based, at least in part, on the values of the first characteristics;
   determining values of the second characteristics from the communication;
   determining second tags associated with the failure based, at least in part, on the values of the second characteristics; and
   selecting at least one script from a plurality of scripts based, at least in part, on the first tags and on the second tags, wherein the at least one script is configured to analyze the communication.

2. The method of claim 1, further comprising:
   determining whether the at least one script can be selected based on the first tags from a plurality of scripts, wherein
      each of the plurality of scripts is configured to be executed to access the contents of the communication, and
      the determining the second characteristics is performed responsive to a determination that the at least one script cannot be selected based on the first tags.

3. The method of claim 1, further comprising:
   determining whether a solution to the failure can be determined based on initial characteristics, wherein
      the communication comprises
         a summary portion that indicates the initial characteristics of the failure, and
      the determining the first tags is performed responsive to a determination that the solution cannot be determined based on the initial characteristics.

4. The method of claim 1, further comprising:
   generating a solution to the failure by executing the at least one script, wherein
      the communication comprises a copy of contents of a memory of the storage controller, and
      the executing the at least one script comprises the at least one script accessing the copy of the contents of the memory of the storage controller.

5. The method of claim 4, wherein
   the generating the solution is based, at least in part, on the at least one script analyzing the copy of the contents of the memory, and
   the solution is communicated to the storage controller.

6. The method of claim 4, further comprising:
   determining whether the failure is associated with a distributed process,
   responsive to a determination that the failure is associated with the distributed process,
      accessing a log file, wherein
         the log file indicates a plurality of operations performed by a plurality of storage controllers,
         the plurality of storage controllers implement the distributed process, and
         the determining the second tags is further based on the accessing of the log file.

7. The method of claim 1, wherein
   each of the plurality of scripts is associated with a respective subset of the plurality of tags.

8. The method of claim 1, wherein
   the first tags indicate external characteristics of the storage controller, and
   the second tags indicate a type of the failure in operation of the storage controller.

9. The method of claim 1, further comprising:
   determining whether the at least one script can be selected based on the first tags and the second tags; and
   responsive to a determination that the at least one script cannot be selected based on the first tags and the second tags, determining third tags from the communication, wherein
      the determining the third tags is based, at least in part, on the values of the first characteristics and on the values of the second characteristics.

10. The method of claim 9, wherein
    the storage controller is configured to perform storing of data using a distributed storage system, and
    the third tags indicate a communication failure in the storing of data using the distributed storage system.

11. An article of manufacture comprising non-transitory storage media having machine executable program instructions encoded therein, the machine executable program instructions comprising program instructions to:
    determine whether a solution to a failure in a distributed storage system indicated in a communication can be determined with data in a first part of the communication that indicates the failure;
    after a determination that a solution to the failure cannot be determined with data in a first part of the communication, determine tags based, at least in part, on data indicated in a second part of the communication;
    select a set of test scripts from a plurality of tests scripts based, at least in part, on the tags; and
    successively execute the set of test scripts until either all of the set of test scripts have been executed or a solution results.

12. The article of manufacture of claim 11, wherein the program instructions to successively execute the set of test scripts comprises program instructions to successively execute a number of the set of test scripts up to a threshold without waiting for completion of the executed test scripts.

13. The article of manufacture of claim 11, wherein the program instructions to select a set of test scripts from a plurality of tests scripts comprises program instructions to submit the tags to a test script database and receive the set of test scripts.

14. The article of manufacture of claim 11, wherein the program instructions to determine tags based, at least in part, on data in a second part of the communication comprises program instructions to:
   determine a first set of one or more tags based, at least in part, on the data in the second part of the communication; and
   determine a second set of one or more tags based, at least in part, on the first set of one or more tags, wherein the tags include the first set of one or more tags and the second set of one or more tags.

15. The article of manufacture of claim 14, wherein the program instructions to determine the second set of one or more tags comprises the program instructions to determine the second set of one or more tags also based on the data in the second part of the communication.

16. A computing device comprising:
   a processor;
   a network interface; and
   a non-transitory computer readable storage medium having program instructions stored therein, the program instructions executable by the processor to cause the computing device to,
      determine values of first characteristics indicated by a communication received from a storage controller, wherein the communication indicates a failure,
      determine first tags associated with the failure based, at least in part, on the values of the first characteristics,
      determine second characteristics from the communication based, at least in part, on the values of the first characteristics,
      determine values of the second characteristics from the communication,
      determine second tags associated with the failure based, at least in part, on the values of the second characteristics, and
      select at least one script from a plurality of scripts based, at least in part, on the first tags and on the second tags, wherein the at least one script is configured to analyze the communication.

17. The computing device of claim 16, wherein the program instructions are further executable by the processor to cause the computing device to,
   determine whether the at least one script can be selected based on the first tags from a plurality of scripts, wherein each of the plurality of scripts is configured to be executed to access the contents of the communication, and
   the program instructions are executable by the processor to cause the computing device to determine the second characteristics responsive to a determination that the at least one script cannot be selected based on the first tags.

18. The computing device of claim 16, wherein the program instructions are further executable by the processor to cause the computing device to,
   determine whether a solution to the failure can be determined based on initial characteristics, wherein
      the communication comprises
         a summary portion that indicates the initial characteristics of the failure, and
      the program instructions are executable by the processor to cause the computing device to determine the first tags responsive to a determination that the solution cannot be determined based on the initial characteristics.

19. The computing device of claim 16, wherein the program instructions are further executable by the processor to cause the computing device to,
   generate a solution to the failure by executing the at least one script, wherein
      the communication comprises a copy of contents of a memory of the storage controller, and
      the at least one script, when executed, is configured to access the copy of the contents of the memory of the storage controller.

20. The computing device of claim 19, wherein the program instructions are executable by the processor to cause the computing device to generate the solution based, at least in part, on the at least one script, when executed, being configured to analyze the copy of the contents of the memory, wherein
   the solution is communicated to the storage controller.

* * * * *